Oct. 9, 1928.
H. LYON
1,687,460
BEADED WELTING AND METHOD OF MAKING
Filed June 26, 1924
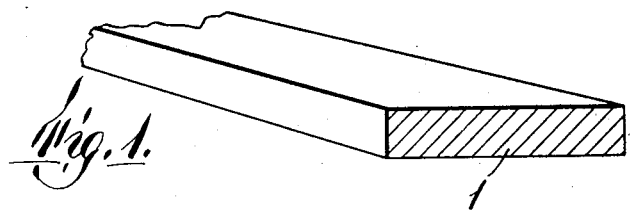
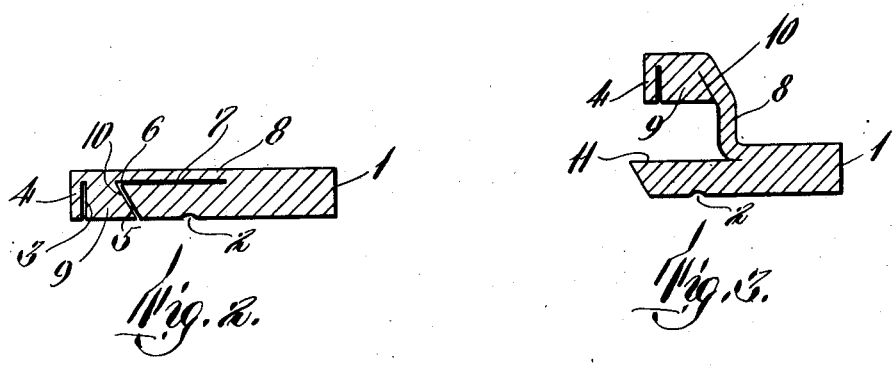
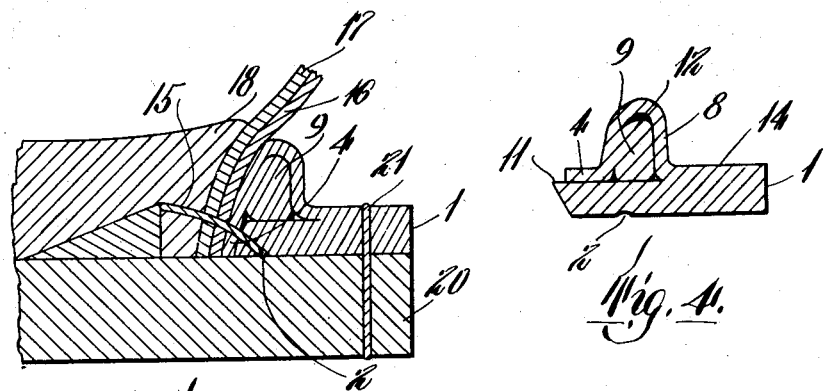
Inventor:
Harry Lyon.

Patented Oct. 9, 1928.

1,687,460

UNITED STATES PATENT OFFICE.

HARRY LYON, OF BROCKTON, MASSACHUSETTS, ASSIGNOR TO BARBOUR WELTING COMPANY, OF BROCKTON, MASSACHUSETTS, A COPARTNERSHIP OF JOHN A. BARBOUR, OF BROOKLINE, MASSACHUSETTS, AND OF PERLEY E. BARBOUR, OF QUINCY, MASSACHUSETTS.

BEADED WELTING AND METHOD OF MAKING.

Application filed June 26, 1924. Serial No. 722,553.

This invention relates to welting of that type which is provided with a rib or bead extending along its top face between its side edges to lie closely against the shoe upper when incorporated in the shoe, the bead to be formed up from an integral portion of a welt strip and presenting the grain side of the leather over its exposed face.

In my Patent No. 1,656,564, granted January 17, 1928, for welt and method of making the same there is disclosed several methods of forming up a welt of this description. In one form of my earlier invention a core strip is partially wrapped about by a cover layer partly severed from a base strip, the free edge of the layer projecting inwardly of the bead thus formed and overlying the upper face of the base strip in position to be fixed to the base strip by the inseam stitches of the shoe. Cement alone is thus not relied upon to retain the bead formed up and in its proper position, nor is stitching, or other fastening means, passing through the bead and welt strip required. This method, however, necessitates the cutting away of a portion of the welt strip along its inner edge and discarding it as waste.

According to this invention the welt strip is so cut and formed, as before, that the bead is held in position by the inseam stitches but without the production of waste, whereby narrower welt strip stock may be utilized to form a finished beaded welt of the same width as the earlier construction.

In order to obtain a more complete understanding of this invention reference may be had to the accompanying drawings in which—

Figure 1 is a perspective of a piece of the blank strip from which the welt is formed.

Figure 2 is an end elevation of the same after it has been cut preparatory to forming up the bead.

Figure 3 is a similar view illustrating the first step in forming the bead.

Figure 4 is a similar view showing the bead formed and the welt completed.

Figure 5 is a fragmentary cross section through a portion of a welt shoe showing the welt of this invention incorporated therein.

A welt strip of substantially rectangular cross section of leather or other suitable material is shown at 1 in Figure 1. This strip is cut as shown in Figure 2, preferably a groove being formed on one face, where leather is used this being the flesh side of the leather, a slit 3 being cut from the same face of the material toward the opposite face adjacent one longitudinal edge thereof to form a narrow layer 4. An inclined slit 5 is also formed spaced from the slit 3 and extending inwardly from the same face of the material and terminating short of the grain side as at 6 from which termination extends a slit 7 substantially parallel with the adjacent face of the blank forming a layer 8 which when leather is employed is from the grain side thereof.

Between the slits 3 and 5 is formed an integral portion 9 which acts as a filler strip or core for the bead. Next the cut portions are bent away from the remainder of the blank as shown in Figure 3, the inclined face 10 on the portion 9 being brought against the under face of the layer 8 as shown in Figure 3. The filler strip portion 9 is then turned or rolled further in the same direction to bring its lower face against the under face of the strip 8 so as to be partially wrapped therein and the thin layer 4 is bent outwardly from the portion 9 to form a layer resting on the upper cut face 11 formed by the cut 7 as shown in Figure 4, the face of the filler portion 9 formed by the cut 3 also bearing against this face 11 inwardly of the portion 4. Cement is preferably applied so that the parts are retained in position to form a welt having a bead 12 formed by the portion 9 partially enclosed by the layer 8 extending lengthwise of the welt between its side edges and the portion 4 forming an integral extension on the inner side of the bead at substantially the level of the uncut face 14 on the opposite side and through which the inseam stitching 15 seated in the groove 2 and passing through the welt, the shoe upper 16, lining 17 and innersole 18 passes. With this construction the cement is not relied upon entirely to hold the bead in its formed up position when the welt is incorporated in the shoe, the inseam stitches 15 passing through the layer 4 and the portion of the welt therebeneath also performing this function. The portions 4 and 8 constitute a cover layer integral with the filler strip or core and within 11. The method of forming a beaded welting which comprises cutting inwardly from one face of a blank strip of substantially rectangular cross section a pair of spaced slits, one of said slits being positioned adjacent to one edge of said strip to define a thin layer, and cutting from the inner end of the other slit a slit substantially parallel to the adjacent face of said strip and away from said one slit, to form a second layer portion, partially wrapping the material between said pair of slits within said second layer portion, and seating the same against the cut face beneath said second layer to form the bead, and bending out said thin layer to overlie said cut face along the adjacent edge of said bead and fixing it thereto.

12. The method of forming a beaded welting which comprises cutting inwardly from one face of a blank strip of substantially rectangular cross section, a pair of spaced slits, one of said slits being positioned adjacent to one edge of said strip to define a thin layer, and cutting from the inner end of the other slit a slit substantially parallel to the adjacent face of said strip and away from said one slit, to form a second layer portion, partially wrapping the material between said pair of slits within said second layer portion, and cementing it in position, and seating the same against the cut face beneath said second layer to form the bead, and bending out said thin layer to overlie said cut face along the adjacent edge of said bead and cementing it in position thereon.

13. A leather welt comprising a body and a bead having its bead covered by a layer formed from a portion of the grain face of the body, said bead having an inseam stitch receiving member at its inner side formed from material cut from the adjacent longitudinal edge face of the body.

14. A leather welt comprising a body and a bead, said bead having an integral core attached to the body by a layer formed from a portion of the grain face of the body and having also an attached layer formed from an edge section of the body.

15. A welt comprising a body portion and a bead extending along one face thereof between its side edges, said bead comprising a core and a covering layer, said covering layer comprising portions of both the upper and the longitudinal edge surfaces of the body portion.

In testimony whereof I have affixed my signature.

HARRY LYON.